Figure 1:
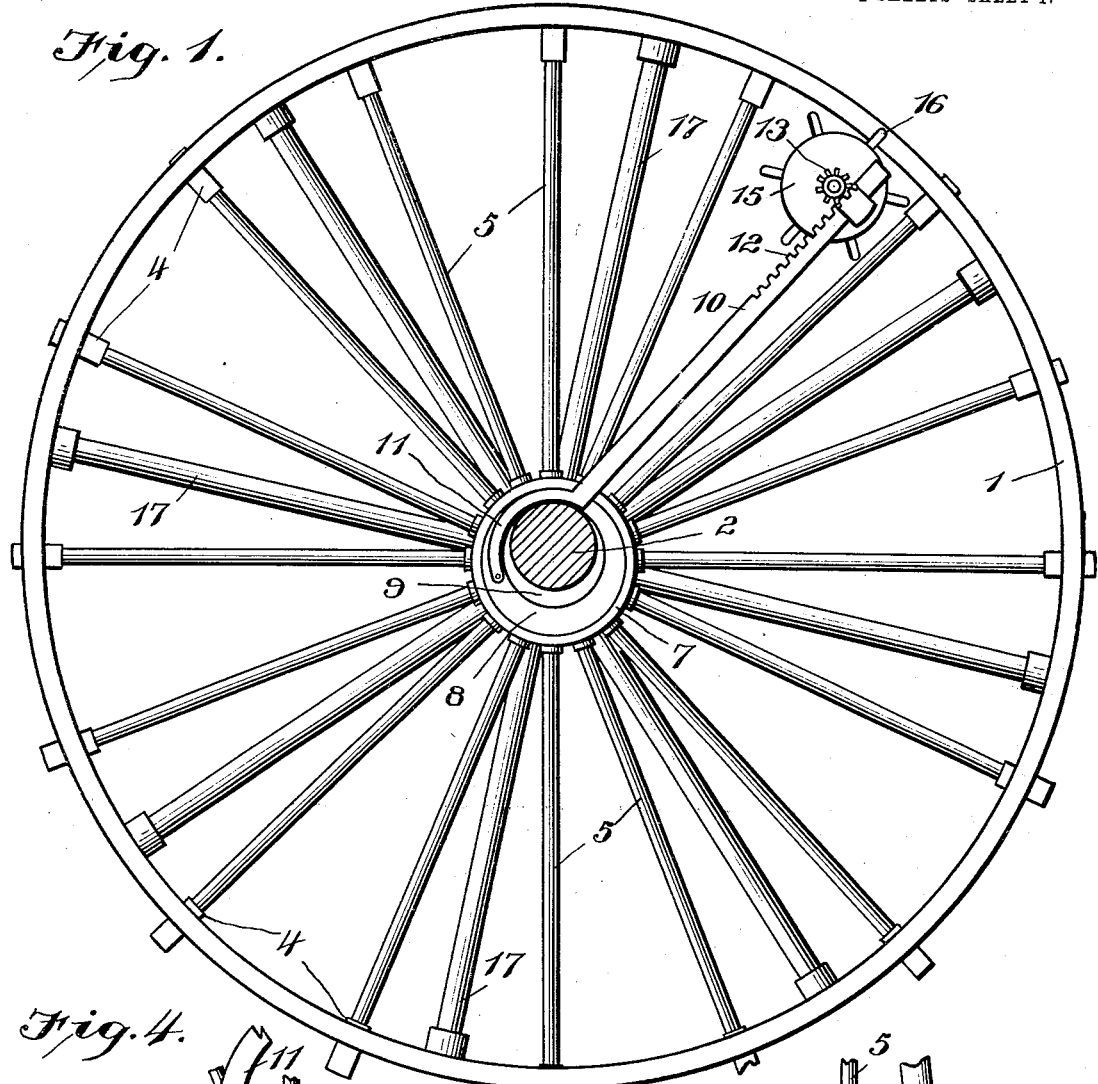

No. 841,507. PATENTED JAN. 15, 1907.
A. E. GLASCOCK.
TRACTION WHEEL.
APPLICATION FILED JUNE 8, 1904. RENEWED JUNE 22, 1906.

2 SHEETS—SHEET 1.

Witnesses
J. P. Brett
[signature]

Inventor
Alfred E. Glascock

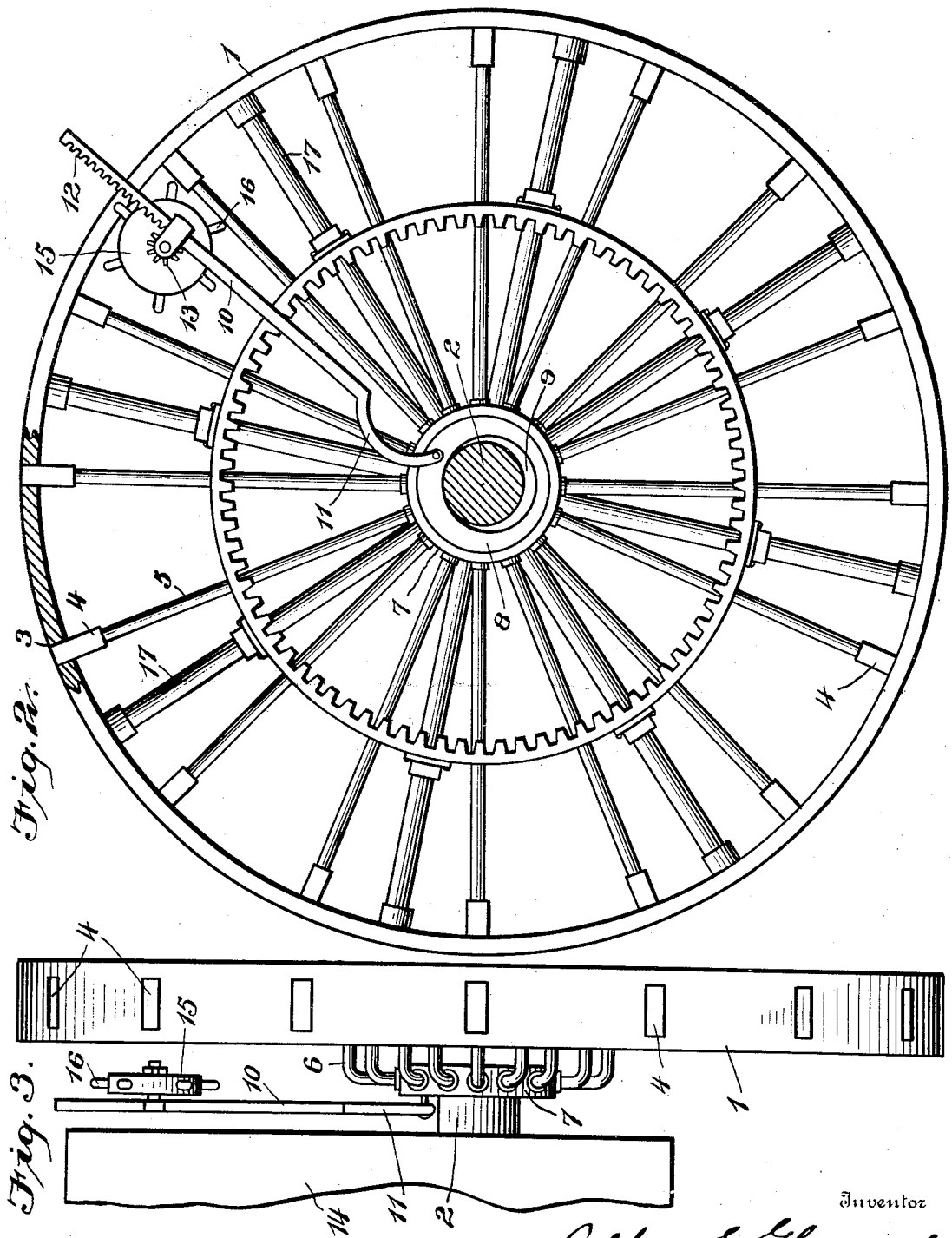

UNITED STATES PATENT OFFICE.

ALFRED E. GLASCOCK, OF WASHINGTON, DISTRICT OF COLUMBIA, ASSIGNOR, BY MESNE ASSIGNMENTS, TO INDUSTRIAL TRANSPORTATION COMPANY, A CORPORATION OF THE DISTRICT OF COLUMBIA.

TRACTION-WHEEL.

No. 841,507. Specification of Letters Patent. Patented Jan. 15, 1907.

Application filed June 8, 1904. Renewed June 22, 1906. Serial No. 322,951.

*To all whom it may concern:*

Be it known that I, ALFRED E. GLASCOCK, a citizen of the United States, residing at Washington, in the District of Columbia, have invented certain new and useful Improvements in Traction-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to traction-wheels; and it consists in the novel construction and arrangement of its parts as hereinafter described.

In order to appreciate the advantages possessed by the present invention, some of the disadvantages of the traction-wheel now generally used will be stated. In such wheels the tractors located on the periphery thereof usually are made rigid or integral therewith. Consequently when the said wheel is passing over soft ground the said tractors collect a great quantity of mud, which tenaciously adheres to the wheel and adds materially to the weight thereof and detracts from the function of the tractors in making frictional contact with the ground. In some wheels the tractors are movable—that is, they may be extended beyond or drawn within the periphery of the wheel; but the above disadvantages are present in this form of wheel when the tractors are extended, for the reason that the tractors when in this position are rigid or immovable, and consequently they collect the mud.

The present invention is for a traction-wheel having a series of movable tractors which are adapted to play in and out of the rim of the wheel as it rotates, and thus keep themselves and the rim of the wheel free from mud. The tractors are so located with relation to the wheel that they project beyond the rim of the wheel at the lower side thereof and come within the rim of the wheel at the upper side thereof and continue the performance of this movement during the rotation of the wheel. A means is also provided whereby the ends of the tractors all around the wheel may be brought flush with the outer periphery of the rim, and thus the wheel may be run on smooth roads or streets without damaging the surfaces thereof.

A further advantage possessed by the present invention is that the tractors may be moved in or out with relation to the wheel-rim while the engine is in motion, thus avoiding the inconvenience and delay of stopping the engine to operate the tractors, a summary of the features of the invention being a traction-wheel with self-cleaning tractors, a traction-wheel in which the tractors may be extended or withdrawn with relation to the wheel-rim at will, and a means for operating the tractors while the engine is in motion or at rest.

Figure 4:
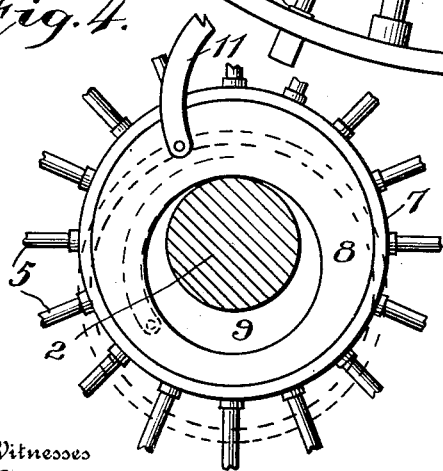
Figure 5:
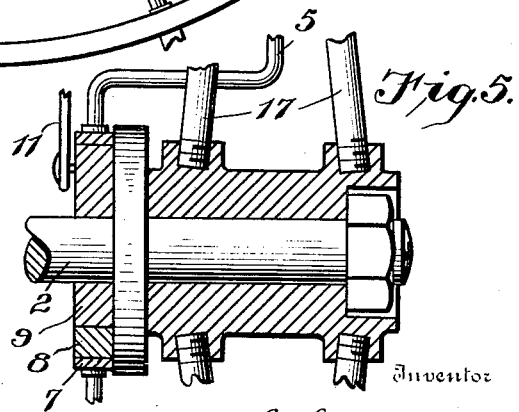

In the accompanying drawings, Figure 1 is a side elevation of the traction-wheel, showing the tractors extended. Fig. 2 is a side elevation of a traction-wheel, partly in section, showing the tractors withdrawn. Fig. 3 is an edge elevation of a traction-wheel mounted on the axle of an engine. Fig. 4 is a detailed enlarged side elevation showing the eccentric within an eccentric located upon the axle. Fig. 5 is a sectional view of the wheel-hub and the eccentrics.

The traction-wheel 1 is journaled upon the axle 2, said wheel 1 having in its rim at suitable intervals apart a series of apertures 3, in which are located the tractors 4. Said tractors are adapted to play in and out of said apertures 3. The rods 5 are fixed at their outer ends to the inner ends of the tractors 4, said rods 5 extending radially with relation to the wheel 1. Each rod 5 is provided at an intermediate point with a horizontal section 6, which extends axially with relation to the wheel 1. The inner ends of the rods 5 are fixed to the ring 7. The said ring, rods, and tractors are rigidly attached together. The ring 7 surrounds the periphery of the eccentric 8, the said eccentric receiving in its interior the eccentric portion 9, located upon the axle 2. The said eccentric 8 fits closely within the ring 7, and the said eccentric 9 fits closely within the eccentric 8. The lever 10 is pivoted at its lower end to the eccentric 8, said lever having near its lower end the curved portion 11, which is adapted to pass around the axle 2 in a manner as shown in Fig. 1 when the tractors 4 are extended. The upper portion of the lever 10 is provided with gear-teeth 12, which are adapted to mesh with the gear-wheel 13, which is journaled to the side of the fire-box 14 (see Fig. 3) or any other suitable stationary portion of the engine. The wheel 15 is fixed to the shaft carrying the gear-wheel 13, said wheel 15 being provided with a suitable number of handles 16. The spokes 17 of the wheel 1 are staggered, as indicated in Fig. 5, and the major portion of the rods 5 extend vertically from the wheel-rim toward the hub, the horizontal portion 6 extending over and connecting with the said ring 7.

The operation of the device is as follows: When it is desired to extend the tractors, as shown in Fig. 1, the operator grasps a handle 16 of the wheel 15 and turns the said wheel, which in turn rotates the gear-wheel 13 and causes the lever 10 to descend, which turns the outer eccentric 8 upon the eccentric portion 9 of the axle 2 and carries the said eccentric 8 to an eccentric position with relation to the wheel 1, the center of the said eccentric 8 being below the center of the wheel 1. Thus the tractors at the lower portion of the wheel 1 are projected beyond the wheel-rim in a position as shown in Fig. 1. As the wheel 1 rotates, the tractors 4 move in and out of the apertures 3. The extreme outward movement of the tractors takes place at the lower side of the wheel and the extreme inward movement of the tractors takes place at the upper side of the wheel. As the said tractors retreat toward the wheel-rim the mud that has collected against them is scraped off by the edges of the apertures 3, and as the tractors move within the wheel-rim the said mud drops from the rim, or if it should adhere about the aperture, the tractor will push it away as it begins its outward movement. Consequently the tractors are kept free from mud and their frictional contact with soft ground is not interfered with. By turning the eccentric 8 a portion of the way around the extent to which the tractors will project at the lower edge of the wheel may be regulated. When the eccentric 8 is in the position as shown in Fig. 2—that is, when its center is concentric with the center of the wheel 1—the outer ends of the tractor 4 are flush with the outer periphery of the wheel-rim, as indicated in said figure. When the parts are in these positions, the wheel may be run over smooth roads or streets without injuring the surfaces thereof.

The horizontal portion 6 of the rods 5 in a measure act as springs for the tractors 4 and give a certain amount of elasticity thereto. Thus if the said tractors strike stones embedded in the earth or come in contact with solid portions of the road-bed the said horizontal portion 6 of the rod 5 permits a limited inward movement of the tractor attached thereto, and consequently the power of the engine is not used in an endeavor to lift the wheel over the tractor, as the retreating tractor permits the rim of the wheel to remain in contact with the ground and pass over the obstruction at the surface or just below the surface. As soon as the said tractor passes over the said obstacle the spring of the metal in the horizontal portion 6 causes the said tractor to project into its normal position.

It will be observed that the tractors may be extended or withdrawn while the engine is in motion and that the operation of the tractors in extending and withdrawing the same may be performed without stopping the engine. Consequently much time is saved in manipulating the tractors. The curved portion 11 of the lever 10 is adapted to pass around or span the axle 2 when the parts are thrown into the positions as shown in Fig. 1. The said curved part 11 also has a tendency to prevent the lever 10 from assuming a dead-center with relation to the axle 2, and consequently the parts can be readily moved at all times.

Having described my invention, what I claim as new, and desire to secure by Letters Patent, is—

1. In a rotating wheel, a series of tractors, a rotatable means for extending the tractors at one side of the wheel without extending them at all sides thereof, and for simultaneously bringing all of the tractors within the wheel-rim.

2. In a rotating wheel, a series of tractors, a means for extending the tractors at one side of the wheel without extending them at all sides thereof, and for simultaneously bringing all of the tractors within the wheel-rim, consisting of a rotatable eccentric surrounding an eccentric located upon the axle, and a means for operating the first said eccentric.

3. In a rotating wheel, a series of tractors, a means for extending the tractors at one side of the wheel without extending them at all sides thereof, and for simultaneously bringing all of the tractors within the wheel-rim, consisting of a rotatable eccentric surrounding an eccentric located upon the axle, a means for operating the first said eccentric, and a ring surrounding the first said eccentric and connected to said tractors.

4. A wheel having movable tractors, a means for moving said tractors consisting of an eccentric journaled upon an eccentric portion of the axle, and being connected with said tractors.

5. A wheel having movable tractors, a means for moving said tractors consisting of an eccentric journaled upon an eccentric portion of the axle, and being connected with said tractors, and an operating-lever attached to said eccentric.

6. A wheel having movable tractors, a means for moving said tractors consisting of an eccentric journaled upon an eccentric portion of the axle, and being connected with said tractors, an operating-lever attached to said eccentric, and a revolving gear-wheel engaging said lever.

7. A wheel having movable tractors, a means for moving said tractors consisting of an eccentric journaled upon an eccentric portion of the axle, and being connected with said tractors, an operating-lever having a curved portion attached to said eccentric.

8. A wheel having movable tractors, a means for moving said tractors consisting of an eccentric surrounding an eccentric, and located upon the axle, said tractors being connected to one of the eccentrics.

9. A wheel having movable tractors, a means for moving said tractors consisting of an eccentric surrounding an eccentric, and located upon the axle, said tractors being connected to one of the eccentrics, an operating-lever attached to one of the eccentrics.

10. A wheel having movable tractors, a means for moving said tractors consisting of an eccentric surrounding an eccentric, and located upon the axle, a ring surrounding the outer eccentric, and being connected to the tractors.

11. A wheel having movable tractors, a means for moving said tractors consisting of an eccentric surrounding an eccentric, and located upon the axle, a ring surrounding the outer eccentric, and being connected to the tractors, and an operating-lever attached to one of the eccentrics.

12. A wheel having movable tractors, a means for moving said tractors consisting of an eccentric surrounding an eccentric, and located upon the axle and connected with the tractors, one of said eccentrics when moved to a certain position being concentric with the wheel, and when moved from such position being eccentric with the wheel.

13. A wheel having movable tractors, a means for moving said tractors consisting of a fixed eccentric within a movable eccentric, and located upon the axle, and connections between the eccentrics and the tractors.

14. A wheel having movable tractors, a means for moving said tractors consisting of a fixed eccentric within a movable eccentric, and located upon the axle, connections between said eccentrics and said tractors, said movable eccentric when moved to a certain position being concentric with the wheel, and when moved from such position being eccentric with the wheel.

15. A wheel having movable tractors, a means for moving said tractors consisting of an eccentric within an eccentric located upon the axle, and connected with the tractors, the outer eccentric being adapted to be brought concentric with the wheel and eccentric therewith.

16. A wheel having a movable tractor, a rod connecting said tractor with the moving means, and having a horizontal spring-section.

17. A wheel having a series of movable tractors connected together, rods connecting said tractors with the moving means, and having horizontal spring-sections.

18. A wheel having a movable tractor, a radially-extending rod connecting said tractor with the moving means, and having a horizontal spring-section.

19. A wheel having a movable tractor, a radially-extending rod connecting said tractor with the moving means, and having a horizontal spring-section extending axially with relation to the wheel.

20. A wheel having a series of movable tractors, radially-extending rods connecting said tractors with the moving means, said rods each having a horizontal spring-section extending axially with relation to the wheel.

In testimony whereof I affix my signature in presence of two witnesses.

ALFRED E. GLASCOCK.

Witnesses:
A. KAUFMAN,
GEO. FRANCIS WILLIAMS.